(12) United States Patent
Wu et al.

(10) Patent No.: US 10,495,026 B2
(45) Date of Patent: Dec. 3, 2019

(54) ENGINE COOLING CONFIGURATIONS WITH WASTE HEAT RECOVERY SYSTEM

(71) Applicant: International Engine Intellectual Property Company, LLC, Lisle, IL (US)

(72) Inventors: Shouhao Wu, Roselle, IL (US); Grzegorz Siuchta, Des Plaines, IL (US); Dean Oppermann, Plainfield, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 165 days.

(21) Appl. No.: 15/631,985

(22) Filed: Jun. 23, 2017

(65) Prior Publication Data
US 2018/0372023 A1    Dec. 27, 2018

(51) Int. Cl.
*F02G 5/02*         (2006.01)
*F01K 23/10*       (2006.01)

(52) U.S. Cl.
CPC ............... *F02G 5/02* (2013.01); *F01K 23/10* (2013.01); *F02G 2260/00* (2013.01)

(58) Field of Classification Search
CPC ........ F01K 23/02; F01K 23/065; F01K 25/10; F02G 5/04; F01N 5/02; F01N 3/10; F01N 13/10
See application file for complete search history.

(56) References Cited

U.S. PATENT DOCUMENTS

| 4,334,409 | A  | * | 6/1982  | Daugas ............... F01K 23/065 60/618 |
| 6,910,333 | B2 | * | 6/2005  | Minemi ............... F01B 17/04 60/614 |
| 7,721,543 | B2 | * | 5/2010  | Massey ................ F01P 9/02 60/39.511 |
| 8,938,964 | B2 | * | 1/2015  | Kanou ................. F01K 7/22 123/568.11 |
| 9,032,927 | B1 | * | 5/2015  | Redon ................. F02B 75/12 123/179.16 |
| 9,217,338 | B2 | * | 12/2015 | Ernst ................... F01K 23/065 |
| 9,939,202 | B2 | * | 4/2018  | Geskes ................ F28D 7/0025 |
| 10,018,079 | B2 | * | 7/2018  | Zhou .................. F01K 15/02 |

(Continued)

*Primary Examiner* — Mark A Laurenzi
*Assistant Examiner* — Shafiq Mian
(74) *Attorney, Agent, or Firm* — Jeffrey P. Calfa; Jack D. Nimz

(57) ABSTRACT

A vehicle has a waste heat recovery (WHR) system and an engine. The WHR system includes a WHR working fluid circuit with a pump, a power turbine, and a condenser. An engine coolant circuit circulates coolant between the engine and an engine coolant heat exchanger/working fluid boiler in the WHR working fluid circuit. At least one exhaust gas heat exchanger/superheater in the WHR working fluid circuit receives waste heat from an exhaust circuit and/or from an exhaust gas recirculation circuit. A working fluid cooled charge air cooler in the WHR working fluid circuit receives waste heat from compressed charge air in a charge air intake circuit. A recuperator may transfer waste heat from working fluid passing from the power turbine to the condenser to working fluid passing from the working fluid cooled charge air cooler to the engine coolant heat exchanger/working fluid boiler.

14 Claims, 8 Drawing Sheets

(56) References Cited

U.S. PATENT DOCUMENTS

| | | | |
|---|---|---|---|
| 2010/0139626 A1* | 6/2010 | Raab | F01P 7/165 |
| | | | 123/540 |
| 2012/0192560 A1* | 8/2012 | Ernst | F01K 23/065 |
| | | | 60/616 |
| 2013/0014505 A1* | 1/2013 | Enokijima | F01K 23/065 |
| | | | 60/615 |
| 2013/0119847 A1* | 5/2013 | Seo | F25D 23/028 |
| | | | 312/405 |
| 2014/0202149 A1 | 7/2014 | Park | |

\* cited by examiner

ENGINE COOLING CONFIGURATIONS WITH WASTE HEAT RECOVERY SYSTEM

BACKGROUND

Field of Invention

Embodiments described herein generally relate to a system and method for integrating engine cooling, charge air cooling, exhaust cooling, and exhaust gas recirculation cooling with a waste heat recovery system that uses a working fluid to recover usable energy from these sources of waste heat.

Related Art

A vehicle, such as a truck, a bus, and the like, is often provided with an engine that converts stored chemical energy in the form of fuel into usable work such as rotational torque and power used to propel the vehicle and to provide for other vehicle power needs. This conversion of chemical energy to usable work is commonly by way of one or more thermodynamic cycles, such as the Otto cycle or the diesel cycle, as non-limiting examples. Due to friction, normal heat losses, and inherent efficiency limitations, the use of such thermodynamic cycles to produce useful work results in the rejection of waste heat to the environment. This commonly takes place by way of a cooling system used to keep the operating machinery of the engine itself within acceptable limits, such as fins for air cooled engines, or a water jacket, radiator, and circulating coolant for water cooled engines. Rejection of waste heat to the environment by an engine utilizing a thermodynamic cycle further takes place by way of the heated exhaust exiting to the environment.

In order to increase the thermal efficiency of such thermodynamic cycles and thereby to improve power and fuel efficiency, it is known to utilize a turbocharger. A turbocharger uses some of the thermal and kinetic energy remaining in the exhaust exiting the engine to drive a turbine, which in turn drives a compressor. The compressor compresses the intake air, which as a result increases in density and temperature. The compressed intake air is therefore commonly passed through an ambient air heat exchanger, known as a charge air cooler, in order to reduce the temperature of the intake, or charge, air before use in the engine. As a result, this charge air cooler further rejects waste heat from the compressed charge air to the environment.

Modern vehicle engines must not only be thermodynamically efficient, but must also minimize exhaust emissions, such as particulates, sulfur oxides, and nitrogen oxides. In order to accomplish this, additional devices and techniques are utilized, such as exhaust gas recirculation and various forms of exhaust aftertreatments, or a combination thereof. Exhaust gas recirculation, for example, allows a controlled amount of exhaust gas from the engine to flow back into the engine intake, in order to limit the formation of nitrogen oxides during the combustion phase of the thermodynamic cycle. However, exhaust gas recirculation also hinders the thermodynamic efficiency of the engine. To minimize the reduction in thermodynamic efficiency due to exhaust gas recirculation while further reducing the formation of nitrogen oxides, it is known to utilize an exhaust gas recirculation cooler. The exhaust gas recirculation cooler further rejects waste heat from the recirculating exhaust gas to the environment, either directly by heat transfer to ambient air or indirectly by heat transfer to the circulating engine coolant.

The various forms of exhaust aftertreatments used may include diesel particulate filters and various forms of catalysts, reductants, and absorbers, or combinations thereof. Certain of these exhaust aftertreatment devices may produce additional heat directly through exothermic reactions, such as with the use of a catalytic converter. Certain other of these exhaust aftertreatment devices may require periodic regeneration in order to consume accumulated pollutants or to eliminate unwanted compounds. For example, a diesel particulate filter must periodically be raised in temperature in order to burn off accumulated carbon particulates, which may occur by way of dosing the exhaust stream with unburnt fuel. The exothermic reactions or regeneration events utilized in these aftertreatment devices, therefore, further results in rejection of waste heat to the environment.

Accordingly, there is an unmet need for a system and method for efficiently recapturing energy presently lost by vehicle engines through these various sources of waste heat.

SUMMARY

Embodiments described herein relate to a system and method for integrating engine cooling, charge air cooling, exhaust cooling, and exhaust gas recirculation cooling with embodiments of waste heat recovery systems that use working fluid to recover usable energy from these sources of waste heat. The system and method may be applied to various types of engines employing any of a number of thermodynamic cycles. The system and method may further be applied to engines used in numerous possible applications, including on and off-road vehicles, equipment, stationary applications, and marine applications, as non-limiting examples. The several embodiments presented herein use Otto cycle or diesel cycle vehicle engines as examples, but this is not to be construed as limiting the scope of the engine cooling configurations with waste heat recovery systems.

More specifically, embodiments of the system and method use embodiments of waste heat recovery (WHR) working fluid circuits that may include a WHR working fluid condenser, a WHR working fluid pump, a WHR working fluid cooled charge air cooler (CAC), a WHR working fluid cooled engine coolant heat exchanger/boiler, a first WHR exhaust gas heat exchanger/superheater, a second WHR exhaust gas recirculation (EGR) gas heat exchanger/superheater, and a WHR power turbine. Certain embodiments of the WHR working fluid circuit may further include a recuperator. Other embodiments of the WHR working fluid circuit may omit one or more of these elements while remaining within the scope of the engine cooling configurations with waste heat recovery system disclosed herein. Further embodiments of the WHR working fluid circuit may utilize an auxiliary coolant radiator. Still further embodiments of the WHR working fluid circuit may use one or more bypass circuits, in order to selectively include or exclude sources of waste heat to be included in the WHR working fluid circuit, for example under conditions of high ambient temperatures or high engine loads.

By using a WHR working fluid cooled engine coolant heat exchanger/boiler, embodiments of the engine cooling configurations with waste heat recovery system fully integrate the engine cooling system with the waste heat recovery system. In this way, the WHR working fluid condenser functions as the main heat rejection device in the system, in place of an engine coolant radiator. Therefore, the WHR working fluid condenser may be the only heat exchanger placed at or near the front of the vehicle in order to utilize ram air in a vehicular application, or that requires one or more cooling fans in other applications. This maintains a large temperature differential between the waste heat sources and the heat sink that is the WHR working fluid condenser, thereby maximizing the thermal efficiency of the WHR system. Furthermore, the use of a WHR working fluid cooled CAC in combination with the WHR working fluid cooled engine coolant heat exchanger/boiler eliminates the necessity for arranging multiple heat exchangers at or near the front of the vehicle, such as a conventional engine coolant radiator, a conventional CAC, and/or any additional WHR working fluid condenser as might be required if the engine cooling system were not fully integrated with the waste heat recovery system. The WHR working fluid condenser itself may be directly air cooled, or may be liquid cooled by way of an additional heat exchanger, according to the particular needs of the application.

The WHR working fluid circuit itself functions as a heat engine and converts some of the waste heat obtained by the WHR working fluid cooled CAC, the WHR working fluid cooled engine coolant heat exchanger/boiler, the first WHR exhaust gas heat exchanger/superheater, and the second WHR EGR gas heat exchanger/superheater to usable work by way of the WHR power turbine. The system and method may utilize a thermodynamic cycle incorporating change in phase of the working fluid, such as a Rankine cycle, an organic Rankine cycle, a regenerative Rankine cycle, a Kalina cycle, and etcetera. The working fluid may be water, or may be an organic fluid, as non-limiting examples.

Power produced by the WHR power turbine may be utilized, for example, to provide additional power to the vehicle driveline directly by way of a mechanical connection. Alternately, power produced by the WHR power turbine may be utilized for other vehicle direct or indirect power needs, such as powering a generator to charge hybrid powertrain batteries, powering vehicle subsystems or accessories such as compressors, pumps, fans, and the like. Therefore, the system and method for integrating engine cooling, charge air cooling, exhaust cooling, and exhaust gas recirculation cooling with a waste heat recovery system may be used with a vehicle having a conventional engine and powertrain, or with a vehicle having a hybrid powertrain of the parallel or series type.

According to one embodiment of the Engine Cooling Configurations with Waste Heat Recovery System, a vehicle has a WHR system and an engine. The WHR system includes a WHR working fluid circuit with a working fluid pump, a power turbine, and a working fluid condenser. An engine coolant circuit circulates engine coolant between the engine and an engine coolant heat exchanger/working fluid boiler. The engine coolant heat exchanger/working fluid boiler is arranged between the working fluid pump and the power turbine in the WHR working fluid circuit. At least one exhaust gas heat exchanger/superheater is arranged between the engine coolant heat exchanger/working fluid boiler and the power turbine in the WHR working fluid circuit. The at least one exhaust gas heat exchanger/superheater receives exhaust gas from an exhaust circuit and/or from an EGR circuit.

According to another embodiment of the Engine Cooling Configurations with Waste Heat Recovery System, a WHR system has a WHR working fluid circuit with a working fluid pump, a power turbine, and a working fluid condenser. An engine coolant heat exchanger/working fluid boiler is in fluid communication with an engine coolant circuit of an engine. The engine coolant heat exchanger/working fluid boiler is arranged between the working fluid pump and the power turbine in the WHR working fluid circuit. At least one exhaust gas heat exchanger/superheater receives exhaust gas from an exhaust circuit and/or an EGR circuit of the engine. The at least one exhaust gas heat exchanger/superheater is arranged between the engine coolant heat exchanger/working fluid boiler and the power turbine in the WHR working fluid circuit.

According to another embodiment of the Engine Cooling Configurations with Waste Heat Recovery System, a method for recovering waste heat in a vehicle includes several steps. The first step is providing a WHR working fluid circuit having a working fluid pump, a power turbine, and a working fluid condenser. The second step is arranging an engine coolant heat exchanger/working fluid boiler between the working fluid pump and the power turbine in the WHR working fluid circuit. The third step is circulating engine coolant between an engine of the vehicle and the engine coolant heat exchanger/working fluid boiler. The fourth step is arranging at least one exhaust gas heat exchanger/superheater between the engine coolant heat exchanger/working fluid boiler and the power turbine in the WHR working fluid circuit. The fifth step is routing exhaust gas from an exhaust circuit and/or from an EGR circuit through the at least one exhaust gas heat exchanger/superheater.

Embodiments of the WHR system are able to extract as much usable work from waste heat as possible from sources including engine coolant, heat from compressed charge air, engine exhaust gas, exothermic and combustion reactions within aftertreatment devices, and EGR gas, at least in part by maintaining a large temperature differential between the waste heat sources and the heat sink that is the WHR working fluid condenser, thereby maximizing the thermal efficiency of the WHR system. Integration of the WHR system with the engine cooling system maximizes the power recovered by the WHR system, and therefore increases the overall engine brake thermal efficiency (BTE) and improves fuel economy. Embodiments of engine cooling configurations with a WHR system are capable of more efficient cooling of both the engine and the WHR system itself, since only the WHR condenser may be located in the front of the truck. This may result in less ram air restriction and better overall cooling of the system. It may further result in more flexible packaging of the heat exchangers and a more aerodynamic vehicle design. Embodiments of engine cooling configurations with a WHR system are adaptable for use with engines of various configurations using any of several thermodynamic cycles, as noted previously. The heat exchangers, boilers, and/or superheaters used in the WHR system may be readily configured using principles of engineering applicable to heat exchangers, boilers, and/or superheaters.

DESCRIPTION OF THE DRAWINGS

The above-mentioned and other features of embodiments of Engine Cooling Configurations with Waste Heat Recovery Systems, and the manner of their working, will become more apparent and will be better understood by reference to the following description of embodiments of the Engine Cooling Configurations with Waste Heat Recovery System taken in conjunction with the accompanying drawings, wherein.

Corresponding reference numbers indicate corresponding parts throughout the several views. The exemplifications set out herein illustrate embodiments of Engine Cooling Configurations with Waste Heat Recovery Systems, and such exemplifications are not to be construed as limiting the scope of the claims in any manner.

DETAILED DESCRIPTION

Figure 1:
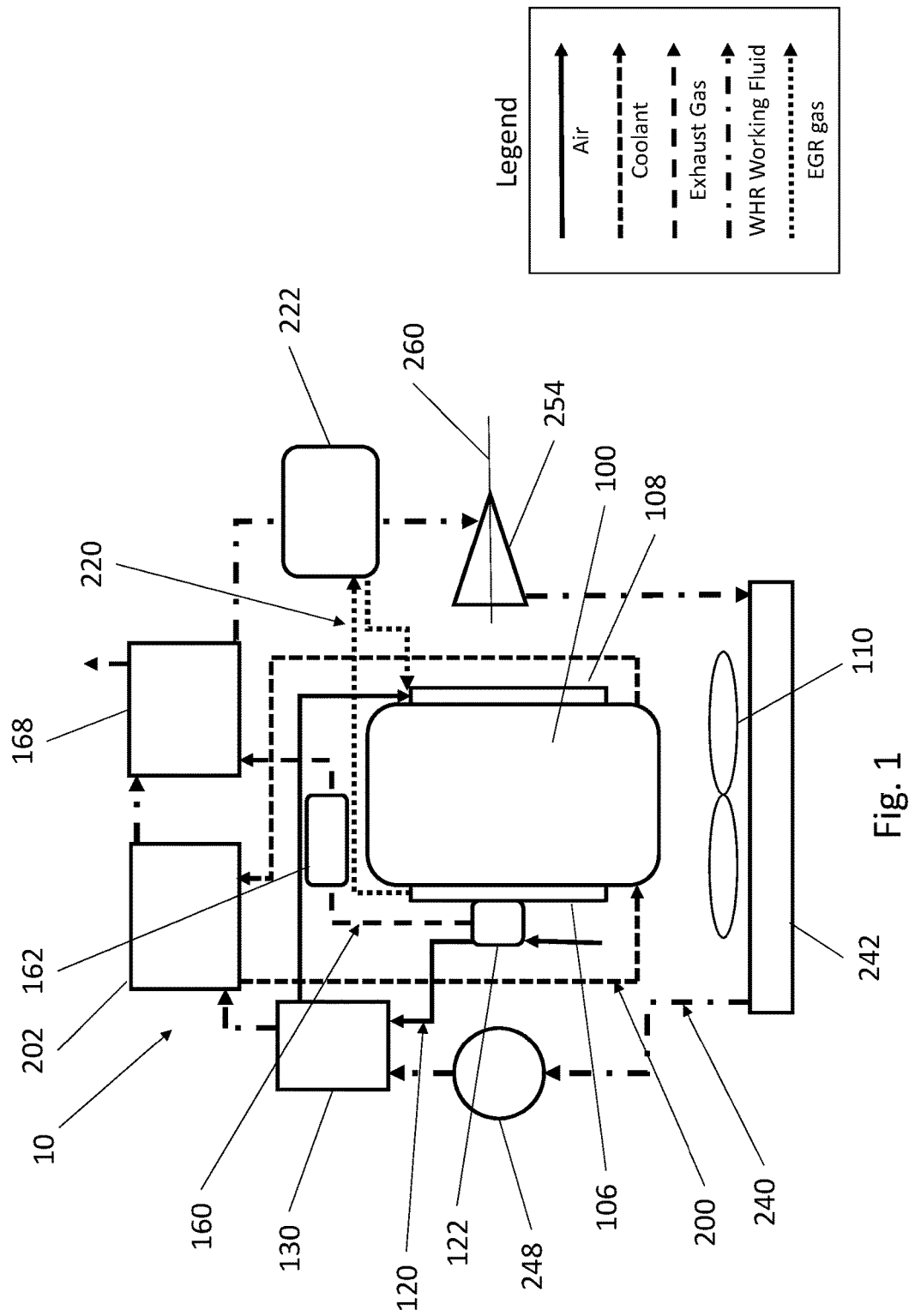
FIG. 1 is a graphical representation of an embodiment of an Engine Cooling Configuration with Waste Heat Recovery System not having a recuperator, identifying the major components thereof, as described herein.

Referring now to FIG. 1, a graphical representation of an embodiment of an engine cooling configuration with a waste heat recovery (WHR) system 10 is shown. An engine 100 is provided for converting stored chemical energy in the form of fuel into usable work such as rotational torque and power used, for example, to propel a vehicle. The engine 100 has an engine charge air intake manifold 108 for distributing intake, or charge, air to the several cylinders of the engine 100. The engine 100 also has an engine exhaust manifold 106 for combining and discharging exhaust gas produced by the several cylinders of the engine 100. The engine 100 is further provided with a turbocharger 122 connected to the engine exhaust manifold 106 for compressing charge air to be delivered to the engine charge air intake manifold 108. One or more exhaust aftertreatment devices 162 are provided for reducing pollutants discharged with the exhaust gas.

An engine coolant circuit 200 circulates engine coolant between the engine 100 and a WHR engine coolant heat exchanger/working fluid boiler 202. A charge air intake circuit 120 delivers charge air to the engine charge air intake manifold 108 from the turbocharger 122 by way of a working fluid cooled charge air cooler (CAC) 130. An exhaust circuit 160 conveys exhaust from the engine exhaust manifold 106 to the environment by way of the one or more exhaust aftertreatment devices 162 and by way of a first WHR exhaust gas heat exchanger/superheater 168. An exhaust gas recirculation (EGR) circuit 220 allows a controlled amount of exhaust gas from the engine exhaust manifold 106 to flow back into the engine charge air intake manifold 108 by way of a second WHR EGR gas heat exchanger/superheater 222.

A WHR working fluid circuit 240 is provided with a WHR working fluid pump 248 that pumps working fluid through the working fluid cooled CAC 130 to the WHR engine coolant heat exchanger/working fluid boiler 202. The working fluid in passing through the working fluid cooled CAC 130 is heated by waste heat from the charge air compressed by the turbocharger 122. The WHR engine coolant heat exchanger/working fluid boiler 202 heats the working fluid to a gaseous state using waste heat from the engine coolant. The first WHR exhaust gas heat exchanger/superheater 168 superheats the working fluid using waste heat from the exhaust that may have been further heated by the one or more exhaust aftertreatment devices 162. The second WHR EGR gas heat exchanger/superheater 222 further superheats the working fluid using waste heat from the exhaust gas recirculating from the engine exhaust manifold 106 back into the engine charge air intake manifold 108.

At this point, the superheated working fluid enters a WHR power turbine 254, which extracts usable work from the working fluid in the form of rotational torque and power delivered by a WHR power turbine output shaft 260. The spent working fluid then travels from the WHR power turbine 254 to a WHR working fluid condenser 242. The WHR working fluid condenser 242, cooled by an engine cooling fan 110 then rejects the remaining waste heat to the environment, as the working fluid condenses from a gaseous or saturated state back to a liquid state. The working fluid is then returned to the WHR working fluid pump 248 to restart the cycle, which may approximate a Rankine cycle.

Figure 2:
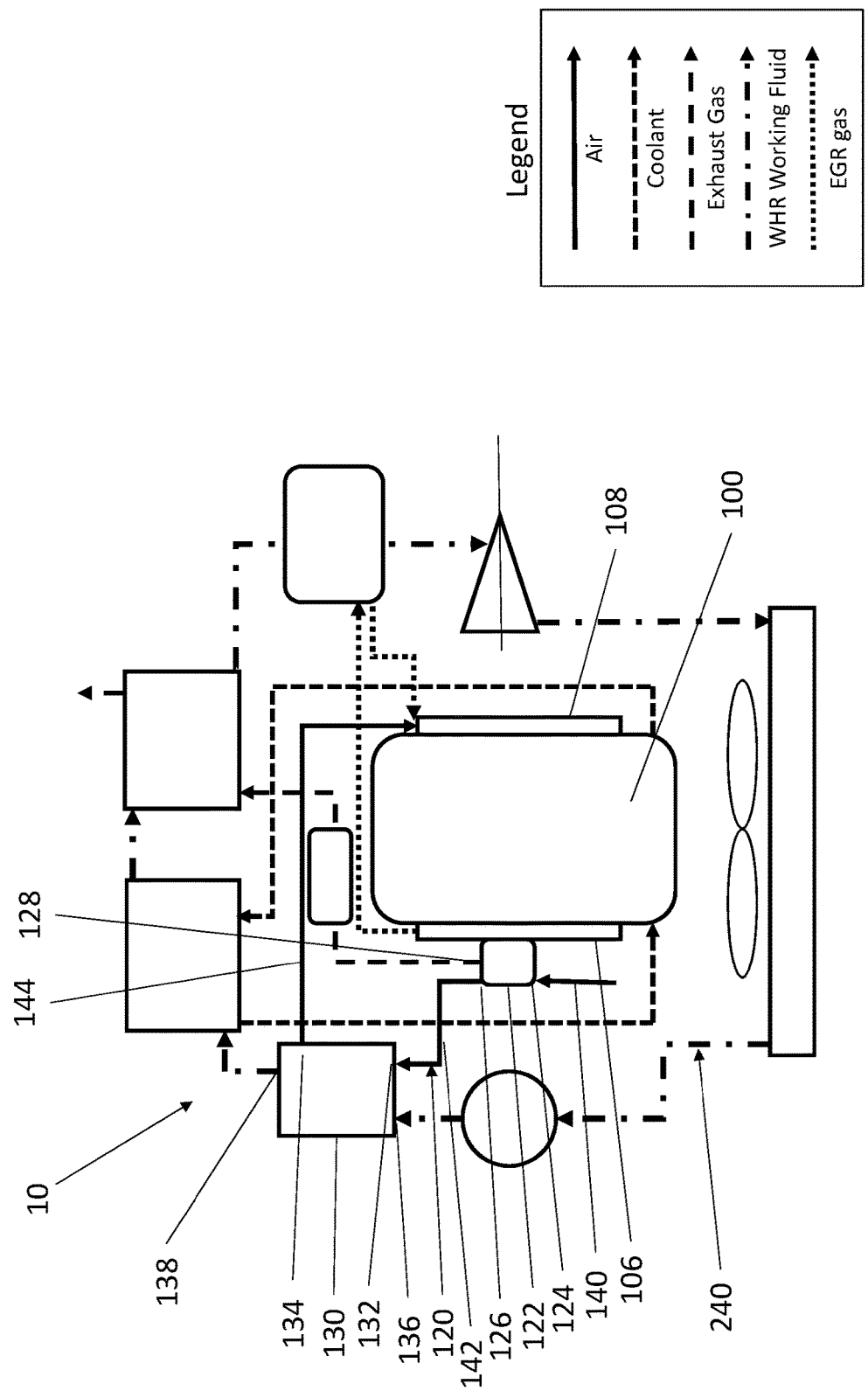
FIG. 2 is a graphical representation of an embodiment of an Engine Cooling Configuration with Waste Heat Recovery System not having a recuperator, identifying the components of the charge air intake circuit, as described herein.

Turning now to FIG. 2, a graphical representation of an embodiment of an engine cooling configuration with a WHR system 10 is shown, illustrating and enumerating further details of the charge air intake circuit 120. Charge air enters the charge air intake circuit 120 at charge air intake pipe 140 and is delivered to turbocharger ambient charge air inlet 124 of the turbocharger 122. The turbocharger 122 compresses the charge air using power derived from the flow of exhaust from the engine exhaust manifold 106, which flow of exhaust then exits the turbocharger 122 at turbocharger exhaust outlet 128. The hot compressed charge air exits the turbocharger 122 at turbocharger compressed charge air outlet 126 and is delivered to CAC charge air inlet 132 of the working fluid cooled CAC 130 using turbocharger to CAC charge air inlet pipe 142.

Simultaneously, working fluid from the WHR working fluid circuit 240 enters the working fluid cooled CAC 130 at CAC working fluid inlet 136. As the compressed charge air and the working fluid pass through the working fluid cooled CAC 130, heat is transferred from the compressed charge air to the working fluid. The heated working fluid exits the working fluid cooled CAC 130 at CAC working fluid outlet 138, while the cooled compressed charge air exits the working fluid cooled CAC 130 at CAC charge air outlet 134. The cooled compressed charge air then passes through CAC charge air outlet to engine charge air intake manifold pipe 144 to the engine charge air intake manifold 108 of the engine 100.

Figure 3:
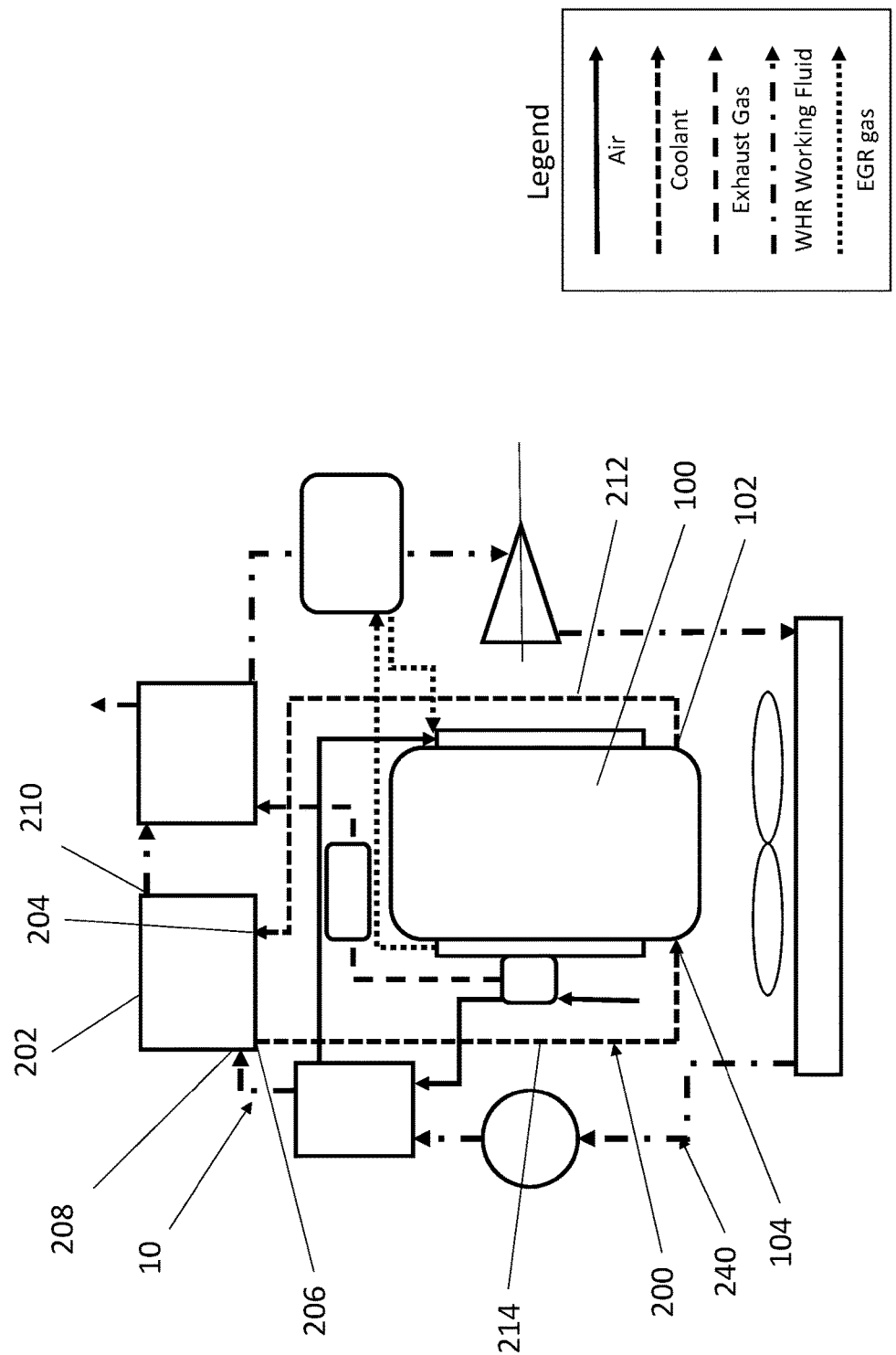
FIG. 3 is a graphical representation of an embodiment of an Engine Cooling Configuration with Waste Heat Recovery System not having a recuperator, identifying the components of the engine coolant circuit, as described herein.

Turning now to FIG. 3, a graphical representation of an embodiment of an engine cooling configuration with a WHR system 10 is shown, illustrating and enumerating further details of the engine coolant circuit 200. Heated engine coolant exits the engine 100 at engine coolant outlet 102 and is conveyed by engine coolant outlet to WHR heat exchanger/boiler coolant inlet pipe 212 to WHR heat exchanger/boiler coolant inlet 204 of the WHR engine coolant heat exchanger/working fluid boiler 202. Simultaneously, working fluid from the WHR working fluid circuit 240 enters the WHR engine coolant heat exchanger/working fluid boiler 202 at WHR heat exchanger/boiler working fluid inlet 208.

As the heated engine coolant and the working fluid pass through the WHR engine coolant heat exchanger/working fluid boiler 202, further heat is transferred from the heated engine coolant to the working fluid. As a result, the working fluid changes, or partially changes, from a liquid phase to a gaseous phase. The proportion of working fluid that changes from a liquid phase to a gaseous phase within the WHR engine coolant heat exchanger/working fluid boiler 202 may be controlled by varying the flow of working fluid through the WHR engine coolant heat exchanger/working fluid boiler 202, or by limiting the amount of pressure developed within the WHR engine coolant heat exchanger/working fluid boiler 202, or by a combination thereof. The at least partially gaseous working fluid then exits the WHR engine coolant heat exchanger/working fluid boiler 202 at WHR heat exchanger/boiler working fluid outlet 210, while the cooled engine coolant exits the WHR engine coolant heat exchanger/working fluid boiler 202 at WHR heat exchanger/boiler coolant outlet 206. The cooled engine coolant then passes through WHR heat exchanger/boiler coolant outlet to engine coolant inlet pipe 214 to engine coolant inlet 104 of the engine 100.

Figure 4:
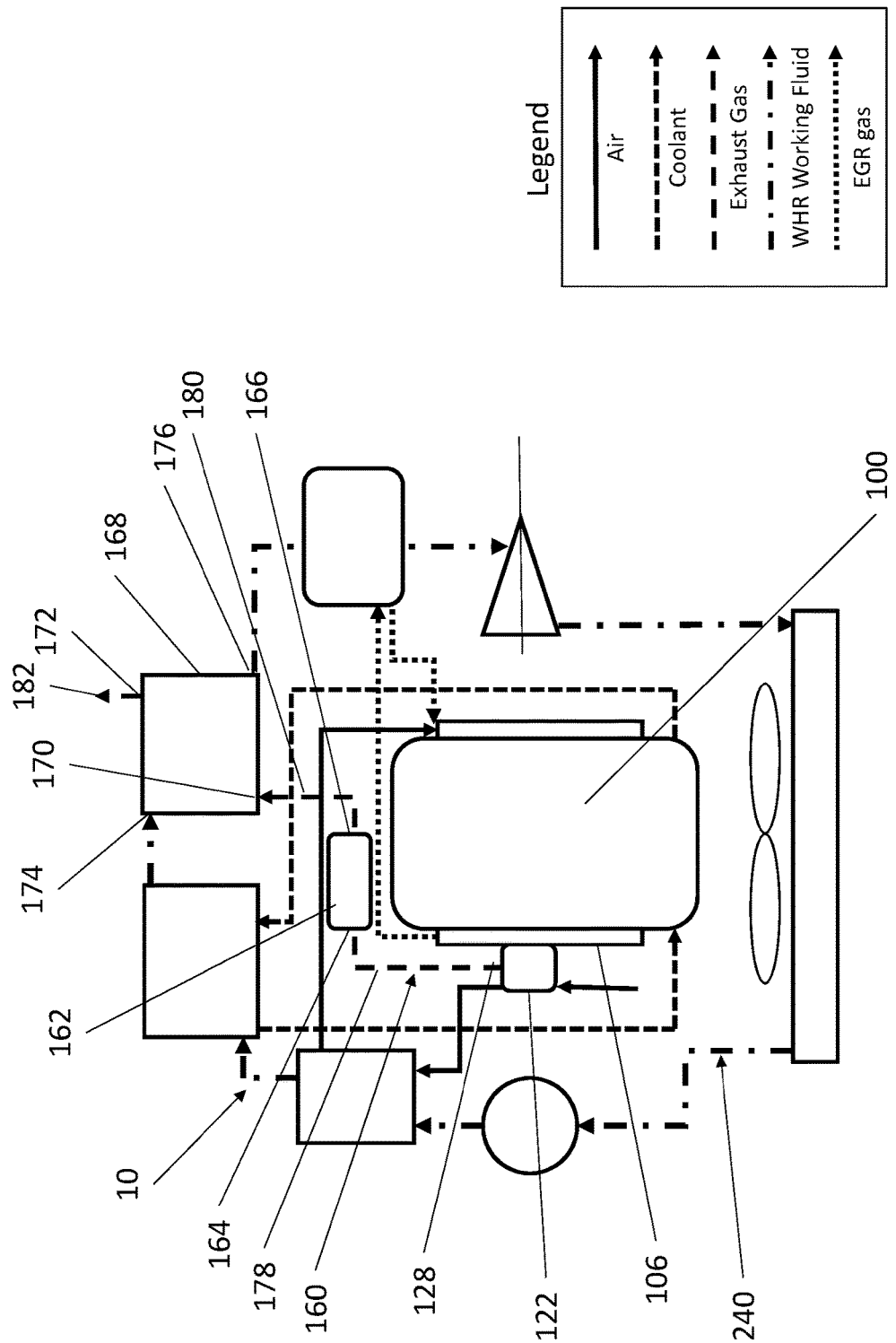
FIG. 4 is a graphical representation of an embodiment of an Engine Cooling Configuration with Waste Heat Recovery System not having a recuperator, identifying the components of the exhaust circuit, as described herein.

Turning now to FIG. 4, a graphical representation of an embodiment of an engine cooling configuration with a WHR system 10 is shown, illustrating and enumerating further details of the exhaust circuit 160. Hot exhaust gas from the engine exhaust manifold 106 of the engine 100 exits the turbocharger 122 at turbocharger exhaust outlet 128, and is conveyed by turbocharger exhaust outlet to exhaust aftertreatment device exhaust inlet pipe 178 to one or more exhaust aftertreatment devices 162. The hot exhaust gas enters the one or more exhaust aftertreatment devices 162 at exhaust aftertreatment devices exhaust inlet 164. In passing through the one or more exhaust aftertreatment devices 162, the exhaust gas may be further heated by an exothermic reaction or combustion taking place within the one or more exhaust aftertreatment devices 162. The further heated exhaust gas then exits the one or more exhaust aftertreatment devices 162 at exhaust aftertreatment devices exhaust outlet 166.

The hot exhaust gas is then is conveyed by exhaust aftertreatment device exhaust outlet to first WHR heat exchanger/superheater exhaust inlet pipe 180 to first WHR heat exchanger/superheater exhaust inlet 170 of the first WHR exhaust gas heat exchanger/superheater 168. Simultaneously, working fluid from the WHR working fluid circuit 240 enters the first WHR exhaust gas heat exchanger/superheater 168 at first WHR heat exchanger/superheater working fluid inlet 174. As the hot exhaust gas and the working fluid pass through the first WHR exhaust gas heat exchanger/superheater 168, further heat from the hot exhaust gas is transferred to the working fluid, thereby superheating the working fluid. The superheated working fluid then exits the first WHR exhaust gas heat exchanger/superheater 168 at first WHR heat exchanger/superheater working fluid outlet 176, while the cooled exhaust gas exits the first WHR exhaust gas heat exchanger/superheater 168 at first WHR heat exchanger/superheater exhaust outlet 172 and exits to the environment through first WHR heat exchanger/superheater exhaust outlet pipe 182.

Figure 5:
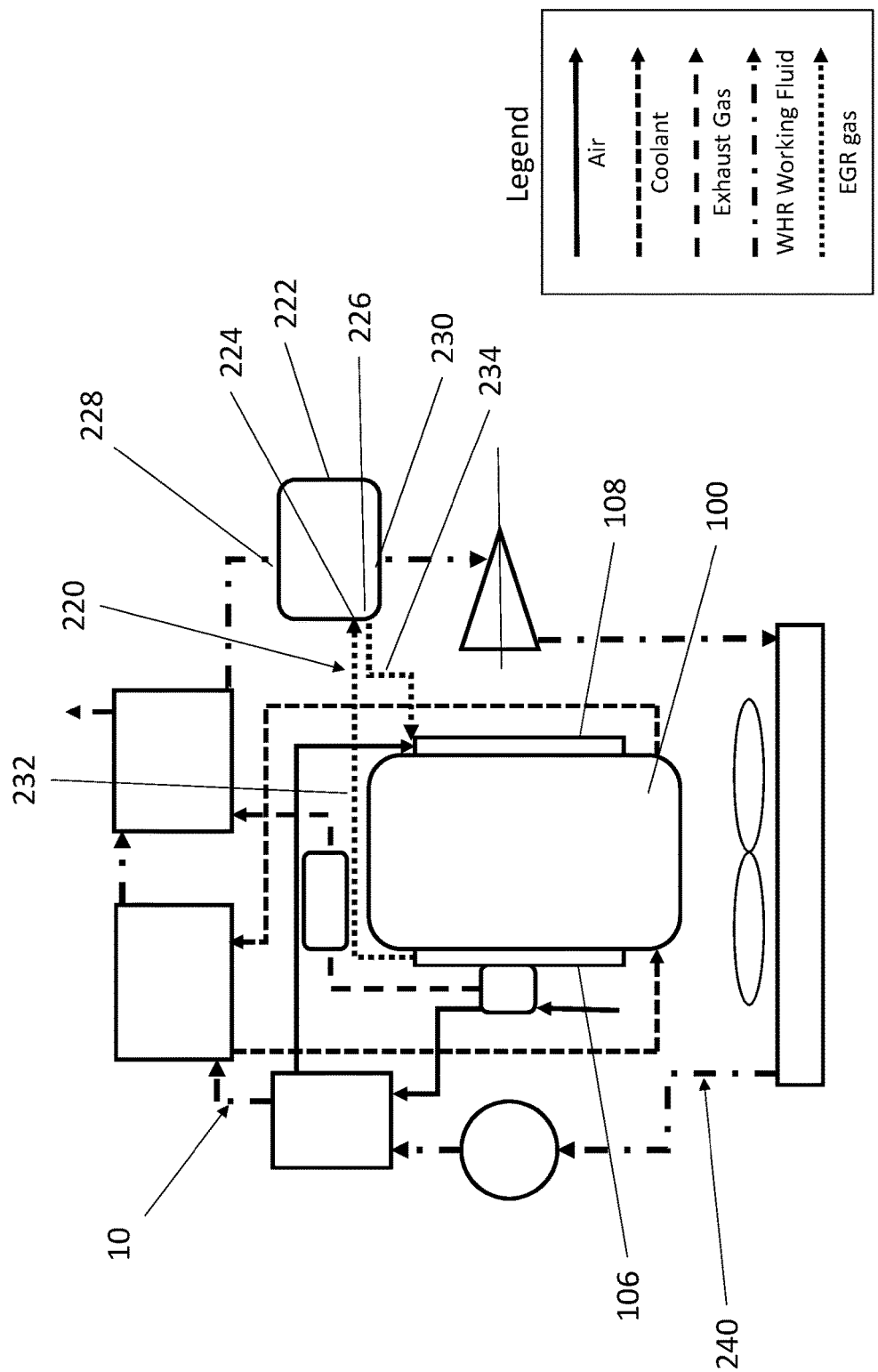
FIG. 5 is a graphical representation of an embodiment of an Engine Cooling Configuration with Waste Heat Recovery System not having a recuperator, identifying the components of the exhaust gas recirculation circuit, as described herein.

Turning now to FIG. 5, a graphical representation of an embodiment of an engine cooling configuration with a WHR system 10 is shown, illustrating and enumerating further details of the EGR circuit 220. Hot recirculation exhaust gas exits the engine 100 at the engine exhaust manifold 106 and is conveyed by engine exhaust manifold to second WHR heat exchanger/superheater EGR inlet pipe 232 to second WHR heat exchanger/superheater EGR inlet 224 of the second WHR EGR gas heat exchanger/superheater 222. Simultaneously, superheated working fluid from the WHR working fluid circuit 240 enters the second WHR EGR gas heat exchanger/superheater 222 at second WHR heat exchanger/superheater working fluid inlet 228.

As the hot recirculation exhaust gas and the working fluid pass through the second WHR EGR gas heat exchanger/superheater 222, further heat from the hot recirculation exhaust gas is transferred to the working fluid, thereby superheating the working fluid to a greater degree. The further superheated working fluid then exits the second WHR EGR gas heat exchanger/superheater 222 at second WHR heat exchanger/superheater working fluid outlet 230, while the cooled recirculation exhaust gas exits the second WHR EGR gas heat exchanger/superheater 222 at second WHR heat exchanger/superheater EGR outlet 226. Second WHR heat exchanger/superheater EGR outlet to engine charge air intake manifold pipe 234 then conveys the cooled recirculation exhaust gas to the engine charge air intake manifold 108 of the engine 100.

Figure 6:
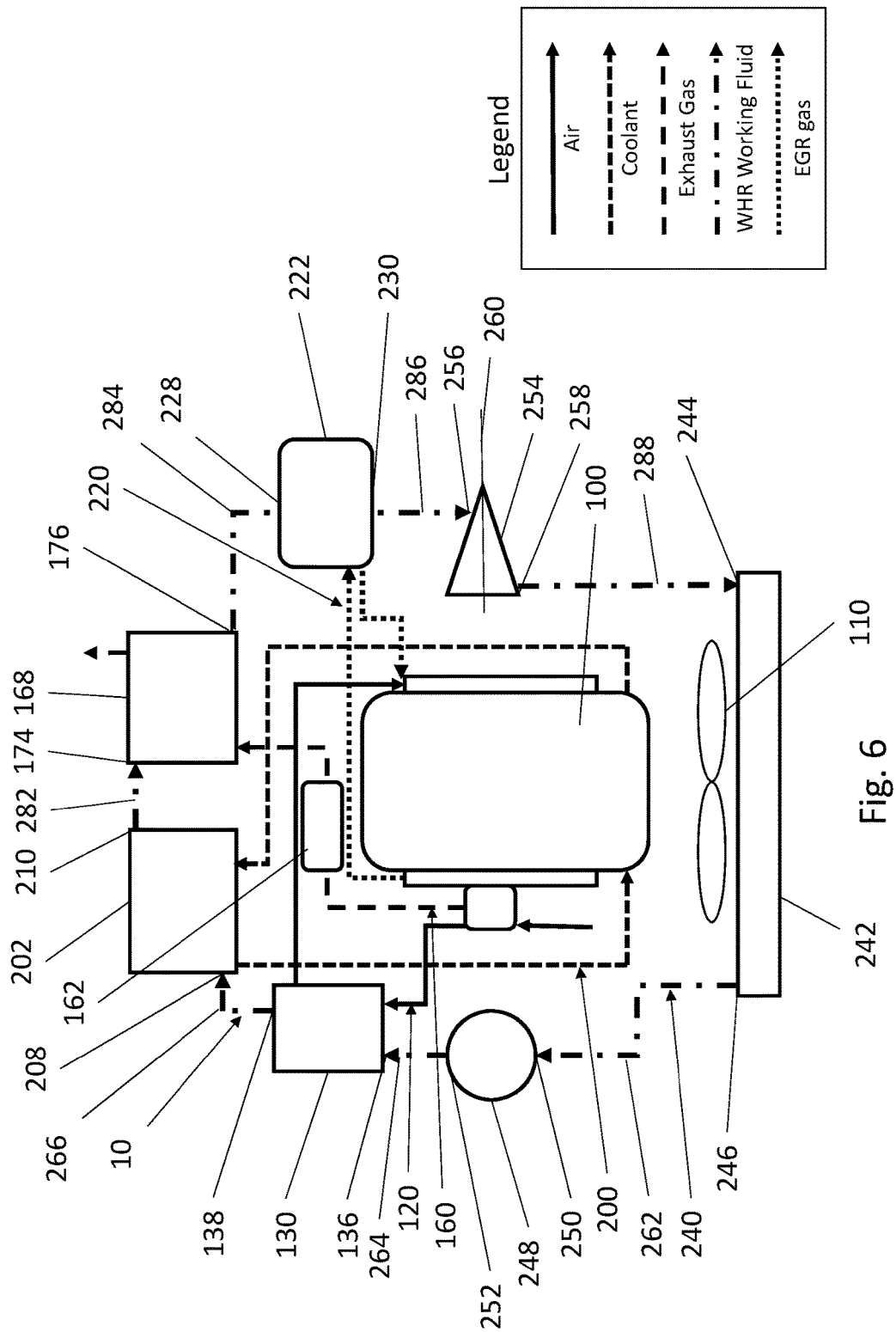
FIG. 6 is a graphical representation of an embodiment of an Engine Cooling Configuration with Waste Heat Recovery System not having a recuperator, identifying the components of the waste heat recovery working fluid circuit, as described herein.

Turning now to FIG. 6, a graphical representation of an embodiment of an engine cooling configuration with a WHR system 10 is shown, illustrating and enumerating further details of the WHR working fluid circuit 240. Working fluid in a liquid phase enters the WHR working fluid pump 248 at WHR pump working fluid inlet 250 and exits the WHR working fluid pump 248 under pressure at WHR pump working fluid outlet 252. WHR pump working fluid outlet to CAC working fluid inlet pipe 264 then conveys the working fluid to CAC working fluid inlet 136 of the working fluid cooled CAC 130. The working fluid cooled CAC 130, which is part of the charge air intake circuit 120, transfers waste heat from the hot compressed charge air to the working fluid, as noted previously. CAC working fluid outlet to WHR heat exchanger/boiler working fluid inlet pipe 266 then conveys the heated working fluid from CAC working fluid outlet 138 of the working fluid cooled CAC 130 to WHR heat exchanger/boiler working fluid inlet 208 of the WHR engine coolant heat exchanger/working fluid boiler 202.

The WHR engine coolant heat exchanger/working fluid boiler 202, which is part of the engine coolant circuit 200, transfers waste heat from the hot engine coolant coming from the engine 100 to the heated working fluid coming from the working fluid cooled CAC 130, as noted previously. As a result, the working fluid changes, or partially changes, from the liquid phase to the gaseous phase, the proportion of which may be controlled as described previously. WHR heat exchanger/boiler working fluid outlet to first WHR heat exchanger/superheater working fluid inlet pipe 282 then conveys the at least partially gaseous working fluid from WHR heat exchanger/boiler working fluid outlet 210 of the WHR engine coolant heat exchanger/working fluid boiler 202 to first WHR heat exchanger/superheater working fluid inlet 174 of the first WHR exhaust gas heat exchanger/superheater 168.

The first WHR exhaust gas heat exchanger/superheater 168, which is part of the exhaust circuit 160, transfers waste heat from the hot exhaust gas coming from the one or more exhaust aftertreatment devices 162 to the gaseous working fluid coming from the WHR engine coolant heat exchanger/ working fluid boiler 202, thereby superheating the working fluid, as noted previously. First WHR heat exchanger/superheater working fluid outlet to second WHR heat exchanger/ superheater working fluid inlet pipe 284 then conveys the superheated working fluid from first WHR heat exchanger/ superheater working fluid outlet 176 of the first WHR exhaust gas heat exchanger/superheater 168 to second WHR heat exchanger/superheater working fluid inlet 228 of the second WHR EGR gas heat exchanger/superheater 222.

The second WHR EGR gas heat exchanger/superheater 222, which is part of the EGR circuit 220, transfers waste heat from the hot recirculating exhaust gas to the superheated working fluid coming from the first WHR exhaust gas heat exchanger/superheater 168, thereby further superheating the working fluid, as noted previously. Second WHR heat exchanger/superheater working fluid outlet to WHR power turbine working fluid inlet pipe 286 then conveys the further superheated working fluid from second WHR heat exchanger/superheater working fluid outlet 230 of the second WHR EGR gas heat exchanger/superheater 222 to WHR power turbine working fluid inlet 256 of the WHR power turbine 254.

The WHR power turbine 254 extracts usable work from the working fluid in the form of rotational torque and power delivered by WHR power turbine output shaft 260, as noted previously. WHR power turbine working fluid outlet to WHR condenser working fluid inlet pipe 288 then conveys the spent working fluid from WHR power turbine working fluid outlet 258 of the WHR power turbine 254 to WHR condenser working fluid inlet 244 of the WHR working fluid condenser 242. The WHR working fluid condenser 242, cooled by engine cooling fan 110, then rejects the remaining waste heat to the environment, condensing the working fluid back to a liquid state, as noted previously. WHR condenser working fluid outlet to WHR pump working fluid inlet pipe 262 then conveys the condensed working fluid from WHR condenser working fluid outlet 246 of the WHR working fluid condenser 242 to WHR pump working fluid inlet 250 of the WHR working fluid pump 248, where the thermodynamic cycle restarts.

Figure 7:
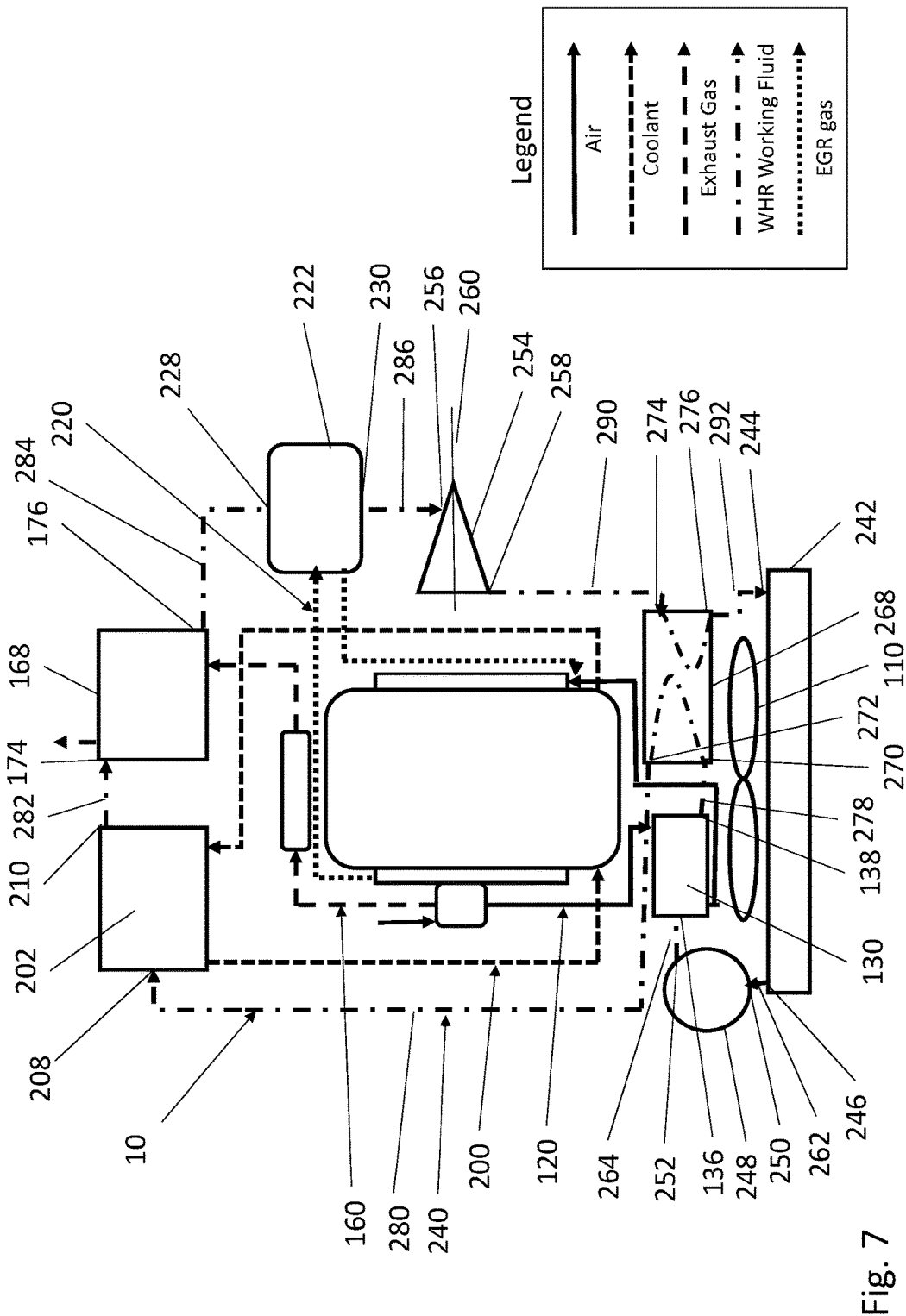
FIG. 7 is a graphical representation of an embodiment of an Engine Cooling Configuration with Waste Heat Recovery System having a recuperator, identifying the components of the waste heat recovery working fluid circuit, as described herein.

Turning now to FIG. 7, a graphical representation of another embodiment of an engine cooling configuration with a WHR system 10 is shown utilizing a WHR recuperator 268. As in the embodiment of an engine cooling configuration with a WHR system 10 in FIG. 6, working fluid of the WHR working fluid circuit 240 in the liquid phase enters the WHR working fluid pump 248 at WHR pump working fluid inlet 250 and exits the WHR working fluid pump 248 under pressure at WHR pump working fluid outlet 252. WHR pump working fluid outlet to CAC working fluid inlet pipe 264 again conveys the working fluid to CAC working fluid inlet 136 of the working fluid cooled CAC 130, part of the charge air intake circuit 120, the function of which has been described.

However, in the embodiment of an engine cooling configuration with a WHR system 10 in FIG. 7, CAC working fluid outlet to WHR recuperator first working fluid inlet pipe 278 then conveys the heated working fluid from CAC working fluid outlet 138 of the working fluid cooled CAC 130 to WHR recuperator first working fluid inlet 270 of the WHR recuperator 268. The working fluid then travels through the WHR recuperator 268, the function of which will be discussed hereinafter, and exits the WHR recuperator 268 at WHR recuperator first working fluid outlet 272. WHR recuperator first working fluid outlet to WHR boiler working fluid inlet pipe 280 then conveys the working fluid from WHR recuperator first working fluid outlet 272 of the WHR recuperator 268 to WHR heat exchanger/boiler working fluid inlet 208 of the WHR engine coolant heat exchanger/ working fluid boiler 202.

From the WHR heat exchanger/boiler working fluid inlet 208 of the WHR engine coolant heat exchanger/working fluid boiler 202 to the WHR power turbine working fluid outlet 258 of the WHR power turbine 254, the embodiment of an engine cooling configuration with a WHR system 10 in FIG. 7 is similar in arrangement to the embodiment of an engine cooling configuration with a WHR system 10 in FIG. 6. That is to say, the working fluid passes through the WHR engine coolant heat exchanger/working fluid boiler 202, which is part of the engine coolant circuit 200, is conveyed from WHR heat exchanger/boiler working fluid outlet 210 of the WHR engine coolant heat exchanger/working fluid boiler 202 to first WHR heat exchanger/superheater working fluid inlet 174 of the first WHR exhaust gas heat exchanger/ superheater 168 by way of WHR heat exchanger/boiler working fluid outlet to first WHR heat exchanger/superheater working fluid inlet pipe 282, passes through the first WHR exhaust gas heat exchanger/superheater 168, which is part of the exhaust circuit 160, is conveyed from first WHR heat exchanger/superheater working fluid outlet 176 of the first WHR exhaust gas heat exchanger/superheater 168 to second WHR heat exchanger/superheater working fluid inlet 228 of the second WHR EGR gas heat exchanger/superheater 222 by way of first WHR heat exchanger/superheater working fluid outlet to second WHR heat exchanger/superheater working fluid inlet pipe 284, passes through the second WHR EGR gas heat exchanger/superheater 222, which is part of the EGR circuit 220, is conveyed from second WHR heat exchanger/superheater working fluid outlet 230 of the second WHR EGR gas heat exchanger/ superheater 222 to WHR power turbine working fluid inlet 256 of the WHR power turbine 254 by way of second WHR heat exchanger/superheater working fluid outlet to WHR power turbine working fluid inlet pipe 286, and passes through WHR power turbine 254 which delivers usable work by way of WHR power turbine output shaft 260. The function of each of the WHR engine coolant heat exchanger/ working fluid boiler 202, the first WHR exhaust gas heat exchanger/superheater 168, and the second WHR EGR gas heat exchanger/superheater 222 have been described previously.

In the embodiment of an engine cooling configuration with a WHR system 10 in FIG. 7, WHR power turbine working fluid outlet to WHR recuperator second working fluid inlet pipe 290 then conveys the working fluid from WHR power turbine working fluid outlet 258 of the WHR power turbine 254 to WHR recuperator second working fluid inlet 274 of the WHR recuperator 268. The working fluid passes through the WHR recuperator 268 to WHR recuperator second working fluid outlet 276, whereupon it is conveyed to WHR condenser working fluid inlet 244 of the WHR working fluid condenser 242 by way of WHR recuperator second working fluid outlet to WHR condenser working fluid inlet pipe 292. The WHR working fluid condenser 242, cooled by engine cooling fan 110, then rejects the remaining waste heat to the environment and condenses the working fluid back to a liquid state, as noted previously. WHR condenser working fluid outlet to WHR pump working fluid inlet pipe 262 then conveys the condensed working fluid from WHR condenser working fluid outlet 246 of the WHR working fluid condenser 242 to WHR pump working fluid inlet 250 of the WHR working fluid pump 248, where the thermodynamic cycle restarts.

The WHR recuperator 268 functions to transfer some of the residual waste heat remaining in the low pressure working fluid that has passed through the WHR power turbine 254 to the high pressure working fluid that has passed through the working fluid cooled CAC 130 prior to the high pressure working fluid being conveyed to the WHR engine coolant heat exchanger/working fluid boiler 202. In this way, the embodiment of an engine cooling configuration with a WHR system 10 shown in FIG. 7 may approximate a regenerative Rankine cycle.

Figure 8:
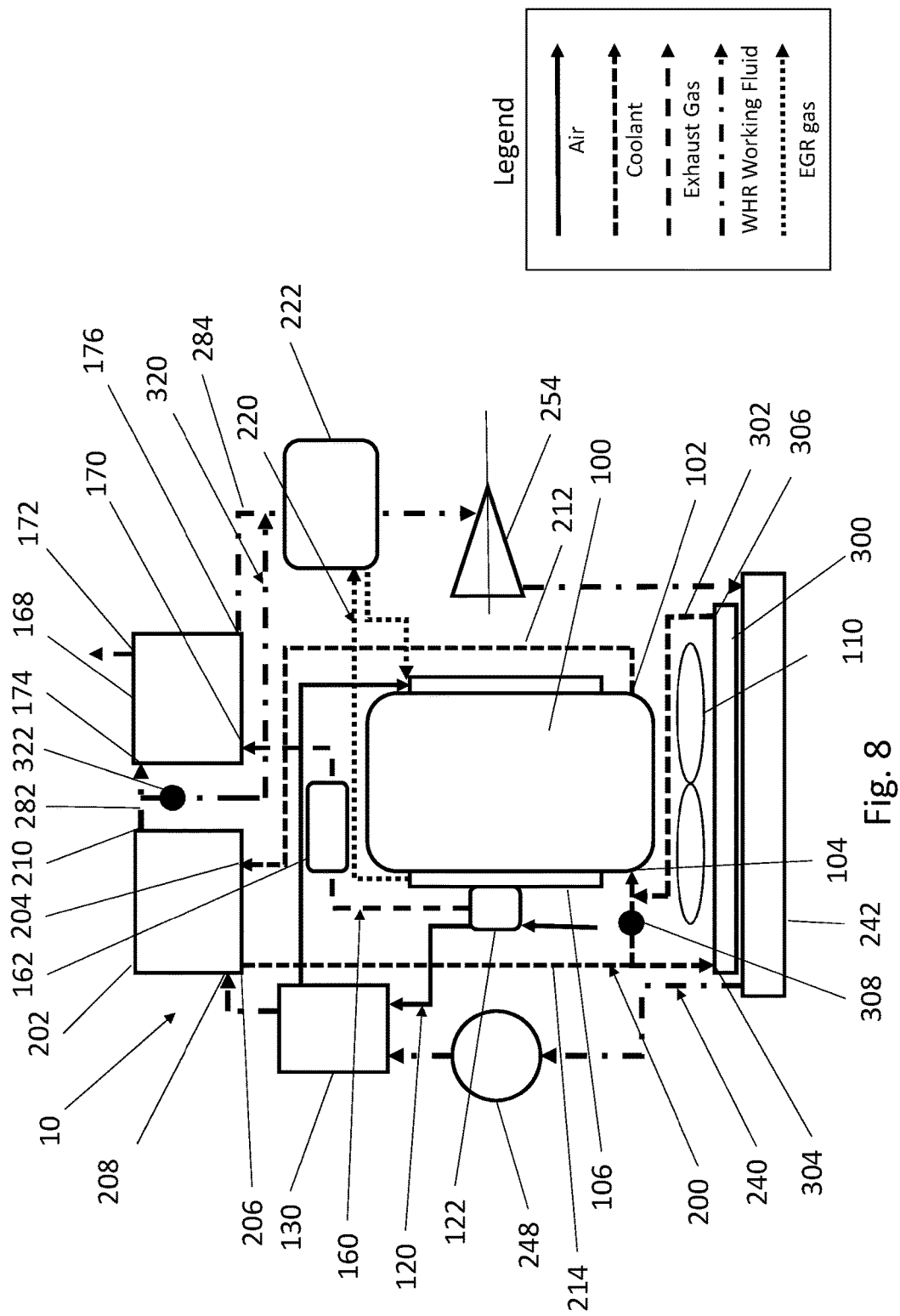
FIG. 8 is a graphical representation of an embodiment of an Engine Cooling Configuration with Waste Heat Recovery System having an auxiliary radiator and bypass circuits in the engine cooling circuit and in the waste heat recovery working fluid circuit.

Turning now to FIG. 8, a graphical representation of another embodiment of an engine cooling configuration with a WHR system 10 is shown utilizing an auxiliary engine coolant radiator 300 and auxiliary engine coolant radiator circuit 302. The embodiment of an engine cooling configuration with a WHR system 10 shown in FIG. 8 further includes a first WHR exhaust gas heat exchanger/superheater bypass circuit 320. As in the embodiment of an engine cooling configuration with a WHR system 10 in FIG. 6, working fluid of the WHR working fluid circuit 240 in the liquid phase enters the WHR working fluid pump 248 and exits the WHR working fluid pump 248 under pressure. The working fluid is then conveyed to the working fluid cooled CAC 130, part of the charge air intake circuit 120, the function of which has been described. The working fluid is then conveyed to WHR heat exchanger/boiler working fluid inlet 208 of the WHR engine coolant heat exchanger/working fluid boiler 202, part of engine coolant circuit 200.

Meanwhile, heated engine coolant exits the engine 100 at engine coolant outlet 102 and is conveyed by engine coolant outlet to WHR heat exchanger/boiler coolant inlet pipe 212 to WHR heat exchanger/boiler coolant inlet 204 of the WHR engine coolant heat exchanger/working fluid boiler 202. As the heated engine coolant and the working fluid pass through the WHR engine coolant heat exchanger/working fluid boiler 202, heat is transferred from the heated engine coolant to the working fluid. As a result, the working fluid changes, or partially changes, from a liquid phase to a gaseous phase, as noted previously. The at least partially gaseous working fluid then exits the WHR engine coolant heat exchanger/working fluid boiler 202 at WHR heat exchanger/boiler working fluid outlet 210, while the cooled engine coolant exits the WHR engine coolant heat exchanger/working fluid boiler 202 at WHR heat exchanger/boiler coolant outlet 206. The cooled engine coolant then passes through WHR heat exchanger/boiler coolant outlet to engine coolant inlet pipe 214 to engine coolant inlet 104 of the engine 100.

However, in the embodiment of an engine cooling configuration with a WHR system 10 shown in FIG. 8, the WHR heat exchanger/boiler coolant outlet to engine coolant inlet pipe 214 intersects with auxiliary engine coolant radiator circuit 302 before and after an auxiliary engine coolant radiator bypass valve 308. In this way, when the auxiliary engine coolant radiator bypass valve 308 is closed, the engine coolant is forced to pass through the auxiliary engine coolant radiator circuit 302, entering the auxiliary engine coolant radiator 300 at auxiliary engine coolant radiator inlet 304 and exiting the auxiliary engine coolant radiator 300 at auxiliary engine coolant radiator outlet 306. The auxiliary engine coolant radiator bypass valve 308 is used to force engine coolant to pass through the auxiliary engine coolant radiator circuit 302 and auxiliary engine coolant radiator 300 when additional cooling is needed to protect the engine 100 and its systems under conditions of high ambient temperature and high engine loads. Under these conditions, the WHR system 10, which is primarily designed to recover usable energy from sources of waste heat, may in this way make use of the auxiliary engine coolant radiator circuit 302 and auxiliary engine coolant radiator 300 to provide additional cooling.

As in the embodiment of an engine cooling configuration with a WHR system 10 in FIG. 6, working fluid from the WHR working fluid circuit 240 then exits the WHR engine coolant heat exchanger/working fluid boiler 202 at WHR heat exchanger/boiler working fluid outlet 210, as noted previously, and is conveyed to the first WHR heat exchanger/superheater working fluid inlet 174 of the first WHR exhaust gas heat exchanger/superheater 168, part of exhaust circuit 160. Meanwhile, hot exhaust gas from the engine exhaust manifold 106 of the engine 100 exits the turbocharger 122, and is conveyed to one or more exhaust aftertreatment devices 162. In passing through the one or more exhaust aftertreatment devices 162, the exhaust gas may again be further heated by an exothermic reaction or combustion taking place within the one or more exhaust aftertreatment devices 162. The hot exhaust gas is then is conveyed to first WHR heat exchanger/superheater exhaust inlet 170 of the first WHR exhaust gas heat exchanger/superheater 168. As before, the hot exhaust gas and the working fluid pass through the first WHR exhaust gas heat exchanger/superheater 168, and further heat from the hot exhaust gas is transferred to the working fluid, thereby superheating the working fluid. The superheated working fluid then exits the first WHR exhaust gas heat exchanger/superheater 168 at first WHR heat exchanger/superheater working fluid outlet 176, while the cooled exhaust gas exits the first WHR exhaust gas heat exchanger/superheater 168 at first WHR heat exchanger/superheater exhaust outlet 172 and exits to the environment.

However, in the embodiment of an engine cooling configuration with a WHR system 10 shown in FIG. 8, the WHR working fluid circuit 240 is provided with a first WHR exhaust gas heat exchanger/superheater bypass circuit 320. The first WHR exhaust gas heat exchanger/superheater bypass circuit 320 extends from WHR heat exchanger/boiler working fluid outlet to first WHR heat exchanger/superheater working fluid inlet pipe 282, to first WHR heat exchanger/superheater working fluid outlet to second WHR heat exchanger/superheater working fluid inlet pipe 284, thereby providing a bypass for the working fluid around the first WHR exhaust gas heat exchanger/superheater 168. In order to control whether the working fluid passes through the first WHR exhaust gas heat exchanger/superheater 168 or through the first WHR exhaust gas heat exchanger/superheater bypass circuit 320, the first WHR exhaust gas heat exchanger/superheater bypass circuit 320 is provided with a first WHR exhaust gas heat exchanger/superheater bypass valve 322.

When the first WHR exhaust gas heat exchanger/superheater bypass valve 322 is closed, the working fluid is forced to pass through the first WHR exhaust gas heat exchanger/superheater 168, and when the first WHR exhaust gas heat exchanger/superheater bypass valve 322 is open, the working fluid is allowed to bypass the first WHR exhaust gas heat exchanger/superheater 168. In this way, under conditions of high ambient temperature and high engine loads, especially when combined with a regeneration or exothermic event within the one or more exhaust aftertreatment devices 162, cooling capacity of the working fluid within the WHR working fluid circuit 240 is conserved for use in the second WHR EGR gas heat exchanger/superheater 222, and/or additional cooling capacity of the WHR system 10 is made available to protect the engine 100 and its systems.

Thereafter, first WHR heat exchanger/superheater working fluid outlet to second WHR heat exchanger/superheater working fluid inlet pipe 284 conveys the working fluid from first WHR heat exchanger/superheater working fluid outlet 176 of the first WHR exhaust gas heat exchanger/superheater 168 to the second WHR EGR gas heat exchanger/superheater 222. As before, the second WHR EGR gas heat exchanger/superheater 222, which is part of the EGR circuit 220, transfers waste heat from the hot recirculating exhaust gas to the working fluid coming from the first WHR exhaust gas heat exchanger/superheater 168 or from the first WHR exhaust gas heat exchanger/superheater bypass circuit 320, thereby further superheating the working fluid, as noted previously. The further superheated working fluid from the second WHR EGR gas heat exchanger/superheater 222 is then conveyed to the WHR power turbine 254, the function of which has been described previously. The spent working fluid from the WHR power turbine 254 is then conveyed to the WHR working fluid condenser 242. The WHR working fluid condenser 242, cooled by engine cooling fan 110, then rejects the remaining waste heat to the environment, condensing the working fluid back to a liquid state, as noted previously. The condensed working fluid from the WHR working fluid condenser 242 is then conveyed to the WHR working fluid pump 248, where the thermodynamic cycle restarts.

It is here noted that certain of the elements of the WHR system 10 may be rearranged while remaining within the spirit and scope of this disclosure. In a non-limiting example, the second WHR EGR gas heat exchanger/superheater 222 may be placed ahead of the first WHR exhaust gas heat exchanger/superheater 168 with respect to the flow of the working fluid through the WHR working fluid circuit 240, so that the WHR EGR gas heat exchanger/superheater 222 initially superheats the working fluid and the WHR exhaust gas heat exchanger/superheater 168 further superheats the working fluid. Similarly, in another non-limiting example, the WHR engine coolant heat exchanger/working fluid boiler 202 may be placed ahead of the working fluid cooled CAC 130 with respect to the flow of the working fluid through the WHR working fluid circuit 240, so that the WHR working fluid engine coolant heat exchanger 202 functions as a working fluid pre-heater, and the working fluid cooled CAC 130 functions as the working fluid boiler. Similarly, in another non-limiting example, the WHR engine coolant heat exchanger/working fluid boiler 202 may be placed in parallel with the working fluid cooled CAC 130 with respect to the flow of the working fluid through the WHR working fluid circuit 240, so that both the WHR working fluid engine coolant heat exchanger 202 and the working fluid cooled CAC 130 function as working fluid boilers.

Similarly, in another non-limiting example, the WHR recuperator 268 may be placed ahead of the working fluid cooled CAC 130 with respect to the flow of the working fluid through the WHR working fluid circuit 240, so that the WHR recuperator 268 transfers residual waste heat remaining in the low pressure working fluid that has passed through the WHR power turbine 254 to the high pressure working fluid prior to its passage through the working fluid cooled CAC 130. These permutations of the WHR system 10 of the Engine Cooling Configuration with Waste Heat Recovery System may be employed in various engine applications according to an optimization of the waste heat characteristics of each engine and application.

It is also contemplated that fewer heat exchangers may be utilized while remaining within the spirit and scope of this disclosure. For non-limiting example, an Engine Cooling Configuration with Waste Heat Recovery System may omit the WHR EGR gas heat exchanger/superheater 222, in an arrangement where no EGR circuit 220 is utilized. Furthermore, it is contemplated that additional heat exchangers may be utilized. As a non-limiting example, an additional condenser/heat exchanger in the WHR working fluid circuit 240 between the WHR power turbine working fluid outlet 258 of the WHR power turbine 254 and the WHR condenser working fluid inlet 244 of the WHR working fluid condenser 242 may be used to provide heat for the HVAC system of the vehicle cabin. In another non-limiting example, if a vehicle is provided with an auxiliary power unit (APU), an additional WHR heat exchanger/superheater may be provided in the WHR working fluid circuit 240 to further superheat the working fluid using the exhaust of the APU. In another non-limiting example, if a vehicle is provided with cab air conditioning, an additional WHR heat exchanger may be provided in the WHR working fluid circuit 240 to further preheat the working fluid proceeding from the WHR working fluid pump 248 to the WHR engine coolant heat exchanger/working fluid boiler 202 using the waste heat from the condenser of the cab air conditioning.

Further optimization of the Engine Cooling Configuration with Waste Heat Recovery System may include configuring the engine cooling fan 110, which may be configured as a pull-type fan as shown, or a push-type fan attached to the front of the WHR working fluid condenser 242, as non-limiting examples. Additionally, a single engine cooling fan 110 may be used as shown, or multiple engine cooling fans may be used, as further non-limiting examples. The engine cooling fan or fans may be mechanically driven, electrically driven, hydraulically driven, pneumatically driven, or otherwise driven, and may be single speed, multiple speed, variable speed, fixed pitch, or variable pitch, as further non-limiting examples. Further optimization of the Engine Cooling Configuration with Waste Heat Recovery System may include use of a variable speed or variable displacement WHR working fluid pump 248, in order to vary the flow of working fluid through the WHR working fluid circuit 240.

While the Engine Cooling Configuration with Waste Heat Recovery System has been described with respect to at least one embodiment, the system and method of using the system can be further modified within the spirit and scope of this disclosure, as demonstrated previously. This application is therefore intended to cover any variations, uses, or adaptations of the system and method of using the system using its general principles. Further, this application is intended to cover such departures from the present disclosure as come within known or customary practice in the art to which the disclosure pertains and which fall within the limits of the appended claims.

What is claimed is:
1. A vehicle having a waste heat recovery (WHR) system, comprising:
    an engine;
    a WHR working fluid circuit having a working fluid pump, a power turbine, and a working fluid condenser;
    an engine coolant circuit circulating engine coolant between the engine and an engine coolant heat exchanger or working fluid boiler, the engine coolant heat exchanger or working fluid boiler being arranged between the working fluid pump and the power turbine in the WHR working fluid circuit;

at least one exhaust gas heat exchanger or superheater arranged between the engine coolant heat exchanger or working fluid boiler and the power turbine in the WHR working fluid circuit, the at least one exhaust gas heat exchanger or superheater receiving exhaust gas from at least one of an exhaust circuit and an exhaust gas recirculation (EGR) circuit;

a charge air intake circuit conducting charge air from a turbocharger through a working fluid cooled charge air cooler to an engine charge air intake manifold, the working fluid cooled charge air cooler being arranged one of:

between the working fluid pump and the engine coolant heat exchanger or working fluid boiler in the WHR working fluid circuit; and in parallel with the engine coolant heat exchanger or working fluid boiler in the WHR working fluid circuit; wherein the working fluid cooled charge air cooler is arranged between the working fluid pump and the engine coolant heat exchanger or working fluid boiler in the WHR working fluid circuit; and a recuperator is arranged in the WHR working fluid circuit between the working fluid cooled charge air cooler and the engine coolant heat exchanger or working fluid boiler and between the power turbine and the working fluid condenser, the recuperator being operable to transfer waste heat from working fluid passing from the power turbine to the working fluid condenser to working fluid passing from the working fluid cooled charge air cooler to the engine coolant heat exchanger or working fluid boiler.

2. The vehicle of claim 1, further comprising:
at least one bypass circuit within the WHR working fluid circuit selectively bypassing at least one of:
at least one of the exhaust gas heat exchanger or superheaters; and the working fluid cooled charge air cooler.

3. The vehicle of claim 1, wherein:
the at least one exhaust gas heat exchanger or superheater further comprises a first exhaust gas heat exchanger or superheater and a second exhaust gas heat exchanger or superheater;
the exhaust gas circuit including at least one exhaust aftertreatment device and the first exhaust gas heat exchanger or superheater, the first exhaust gas heat exchanger or superheater being arranged in the WHR working fluid circuit between the engine coolant heat exchanger or working fluid boiler and the second exhaust gas heat exchanger or superheater; and
the EGR circuit recirculating exhaust gas from an engine exhaust manifold to an engine charge air intake manifold by way of the second exhaust gas heat exchanger or superheater, the second exhaust gas heat exchanger or superheater being arranged in the WHR working fluid circuit between the first exhaust gas heat exchanger or superheater and the power turbine.

4. The vehicle of claim 1, wherein at least one of:
the working fluid condenser is one of air cooled and liquid cooled;
the WHR working fluid circuit uses one of water and organic fluid;
the working fluid pump is one of variable speed and variable displacement;
the power turbine being one of mechanically connected to a driveline, used to power a generator, and used to power a vehicle subsystem or accessory; and the WHR working fluid circuit includes at least one additional heat exchanger in communication with one of a vehicle cabin heater, a vehicle cabin air conditioner, and an auxiliary power unit (APU).

5. The vehicle of claim 1, wherein:
the engine coolant circuit further includes an auxiliary engine coolant radiator circuit having an auxiliary engine coolant radiator, engine coolant flow through the auxiliary engine coolant radiator circuit being controlled by an auxiliary engine coolant radiator bypass valve.

6. A waste heat recovery (WHR) system, comprising:
a WHR working fluid circuit having a working fluid pump, a power turbine, and a working fluid condenser;
an engine coolant heat exchanger or working fluid boiler in fluid communication with an engine coolant circuit of an engine, the engine coolant heat exchanger or working fluid boiler being arranged between the working fluid pump and the power turbine in the WHR working fluid circuit;
at least one exhaust gas heat exchanger or superheater receiving exhaust gas from at least one of an exhaust circuit and an exhaust gas recirculation (EGR) circuit of the engine, the at least one exhaust gas heat exchanger or superheater being arranged between the engine coolant heat exchanger or working fluid boiler and the power turbine in the WHR working fluid circuit;
a working fluid cooled charge air cooler in fluid communication with a charge air intake circuit conducting charge air from a turbocharger to an engine charge air intake manifold of the engine, the working fluid cooled charge air cooler being arranged one of:
between the working fluid pump and the engine coolant heat exchanger or working fluid boiler in the WHR working fluid circuit; and
in parallel with the engine coolant heat exchanger or working fluid boiler in the WHR working fluid circuit, wherein;
the working fluid cooled charge air cooler is arranged between the working fluid pump and the engine coolant heat exchanger or working fluid boiler in the WHR working fluid circuit and a recuperator is arranged in the WHR working fluid circuit between the working fluid cooled charge air cooler and the engine coolant heat exchanger or working fluid boiler and between the power turbine and the working fluid condenser, the recuperator bring operable to transfer waste heat from working fluid passing from the power turbine to the working fluid condenser to working fluid passing from the working fluid cooled charge air cooler to the engine coolant heat exchanger or working fluid boiler.

7. The WHR system of claim 6, further comprising:
at least one bypass circuit within the WHR working fluid circuit selectively bypassing at least one of:
at least one of the exhaust gas heat exchanger or superheaters; and the working fluid cooled charge air cooler.

8. The WHR system of claim 6, wherein:
the at least one exhaust gas heat exchanger or superheater further comprises a first exhaust gas heat exchanger L or superheater and a second exhaust gas heat exchanger or superheater;
the first exhaust gas heat exchanger or superheater being in fluid communication with the exhaust circuit and being arranged in the WHR working fluid circuit between the engine coolant heat exchanger or working fluid boiler and the second exhaust gas heat exchanger or superheater; and the second exhaust gas heat exchanger or superheater being in fluid communication with the EGR circuit and being arranged in the WHR working fluid circuit between the first exhaust gas heat exchanger or superheater and the power turbine.

9. The WHR system of claim 6, wherein at least one of:

the working fluid condenser is one of air cooled and liquid cooled;

the WHR working fluid circuit uses one of water and organic fluid;

the working fluid pump is one of variable speed and variable displacement;

the power turbine being one of mechanically connected to a vehicle driveline, used to power a generator, and used to power a vehicle subsystem or accessory; and the WHR working fluid circuit includes at least one additional heat exchanger in communication with one of a vehicle cabin heater, a vehicle cabin air conditioner, and an auxiliary power unit (APU).

10. The WHR system of claim 6, wherein:

the engine coolant circuit further includes an auxiliary engine coolant radiator circuit having an auxiliary engine coolant radiator, engine coolant flow through the auxiliary engine coolant radiator circuit being controlled by an auxiliary engine coolant radiator bypass valve.

11. A method for recovering waste heat in a vehicle, comprising the steps of:

providing a WHR working fluid circuit having a working fluid pump, a power turbine, and a working fluid condenser;

arranging an engine coolant heat exchanger or working fluid boiler between the working fluid pump and the power turbine in the WHR working fluid circuit;

circulating engine coolant between an engine of the vehicle and the engine coolant heat exchanger or working fluid boiler;

arranging at least one exhaust gas heat exchanger or superheater between the engine coolant heat exchanger or working fluid boiler and the power turbine in the WHR working fluid circuit;

and routing exhaust gas from at least one of an exhaust circuit and an exhaust gas recirculation (EGR) circuit through the at least one exhaust gas heat exchanger or superheater;

arranging a working fluid cooled charge air cooler between the working fluid pump and the engine coolant heat exchanger or working fluid boiler in the WHR working fluid circuit and conducting charge air from a turbocharger through the working fluid cooled charge air cooler to an engine charge air intake manifold of the engine of the vehicle;

arranging a recuperator in the WHR working fluid circuit between the working fluid cooled charge air cooler and the engine coolant heat exchanger or working fluid boiler and between the power turbine and the working fluid condenser; and transferring waste heat from working fluid passing from the power turbine to the working fluid condenser to working fluid passing from the working fluid cooled charge air cooler to the engine coolant heat exchanger or working fluid boiler.

12. The method of claim 11, further comprising the steps of:

arranging at least one bypass circuit within the WHR working fluid circuit and selectively bypassing at least one of:

at least one of the exhaust gas heat exchanger or superheaters; and the working fluid cooled charge air cooler.

13. The method of claim 11, further comprising the steps of:

arranging a first exhaust gas heat exchanger or superheater and a second exhaust gas heat exchanger or superheater between the engine coolant heat exchanger or working fluid boiler and the power turbine in the WHR working fluid circuit;

routing exhaust gas from the engine through at least one exhaust aftertreatment device and through the first exhaust gas heat exchanger or superheater; and routing recirculating exhaust gas from an engine exhaust manifold through the second exhaust gas heat exchanger or superheater to an engine charge air intake manifold.

14. The method of claim 11, further comprising at least one of the steps of:

one of air cooling and liquid cooling the working fluid condenser;

circulating one of water and organic fluid in the WHR working fluid circuit;

configuring the working fluid pump as one of a variable speed working fluid pump and a variable displacement working fluid pump;

one of mechanically connecting the power turbine to a driveline of the vehicle, using the power turbine to power a generator, and using the power turbine to power a vehicle subsystem or accessory; and including at least one additional heat exchanger in the WHR working fluid circuit and placing the at least one additional heat exchanger in communication with one of a vehicle cabin heater, a vehicle cabin air conditioner, and an auxiliary power unit (APU).

* * * * *

UNITED STATES PATENT AND TRADEMARK OFFICE
CERTIFICATE OF CORRECTION

| | | |
|---|---|---|
| PATENT NO. | : 10,495,026 B2 | Page 1 of 1 |
| APPLICATION NO. | : 15/631985 | |
| DATED | : December 3, 2019 | |
| INVENTOR(S) | : Wu et al. | |

It is certified that error appears in the above-identified patent and that said Letters Patent is hereby corrected as shown below:

In the Specification

On Column 1, Line 3, before the "BACKGROUND", please insert the following paragraph:
-- STATEMENT REGARDING FEDERALLY SPONSORED RESEARCH OR DEVELOPMENT
This invention was made with government support under DE-EE0007767 awarded by the U.S. Department of Energy. The Government therefore has certain rights in the invention. --

Signed and Sealed this
Fourteenth Day of February, 2023

Katherine Kelly Vidal
*Director of the United States Patent and Trademark Office*